United States Patent
Barrow

(10) Patent No.: US 9,068,672 B2
(45) Date of Patent: Jun. 30, 2015

(54) T-STYLE GROMMET ATTACHMENT SYSTEM AND METHOD

(71) Applicant: The Boeing Company, Seal Beach, CA (US)

(72) Inventor: David Andrew Barrow, Everett, WA (US)

(73) Assignee: THE BOEING COMPANY, Seal Beach, CA (US)

(*) Notice: Subject to any disclaimer, the term of this patent is extended or adjusted under 35 U.S.C. 154(b) by 0 days.

(21) Appl. No.: 14/062,476

(22) Filed: Oct. 24, 2013

(65) Prior Publication Data

US 2015/0113764 A1  Apr. 30, 2015

(51) Int. Cl.
*F16L 5/00* (2006.01)
*B23P 19/04* (2006.01)

(52) U.S. Cl.
CPC . *F16L 5/00* (2013.01); *B23P 19/04* (2013.01); *Y10T 16/05* (2015.01)

(58) Field of Classification Search
CPC ..... Y10T 16/05; Y10T 16/063; Y10T 16/075; Y10T 16/082; Y10T 16/088; F16L 5/00; B23P 19/04; H02G 3/083; H02G 3/22; B60R 16/0222
USPC ...... 16/2.1–2.5; 174/650, 669, 152 G, 153 G; 248/56; 29/428
See application file for complete search history.

(56) References Cited

U.S. PATENT DOCUMENTS

| 3,011,745 | A  | * | 12/1961 | Reid              | 248/56   |
| 3,889,909 | A  | * | 6/1975  | Koscik            | 248/56   |
| 4,289,288 | A  | * | 9/1981  | Gransberry et al. | 248/56   |
| 4,369,944 | A  | * | 1/1983  | Hobart, Jr.       | 248/56   |
| 4,640,479 | A  | * | 2/1987  | Shely et al.      | 248/56   |
| 5,739,468 | A  | * | 4/1998  | Rossman et al.    | 174/669  |
| 5,911,392 | A  | * | 6/1999  | Greenslate        | 248/74.3 |
| 6,927,338 | B2 | * | 8/2005  | Shimola et al.    | 174/668  |
| 6,951,984 | B2 | * | 10/2005 | Buchberger        | 174/360  |
| 6,960,108 | B1 | * | 11/2005 | Jaszewski et al.  | 440/77   |
| 8,261,409 | B2 | * | 9/2012  | Magennis et al.   | 16/2.1   |

FOREIGN PATENT DOCUMENTS

GB      2 168545 A1   6/1986

OTHER PUBLICATIONS

Notification of Transmittal of the International Search Report and the Written Opinion of the International Searching Authority, or the Declaration, mailed Nov. 5, 2014.

* cited by examiner

*Primary Examiner* — William Miller
(74) *Attorney, Agent, or Firm* — The Boeing Company; Francisco A. Rubio-Campos

(57) ABSTRACT

A grommet is provided for protecting and securing a conveyance system component routed through an aperture in a structure. The grommet includes a strap having a first and second side and two or more pairs of ribs formed along at least a portion of the first side of the strap. The ribs cooperatively define a channel for receiving the edge of the aperture. The grommet further includes a plurality of spaced apart perforations formed along at least portion of the length of the strap.

17 Claims, 11 Drawing Sheets

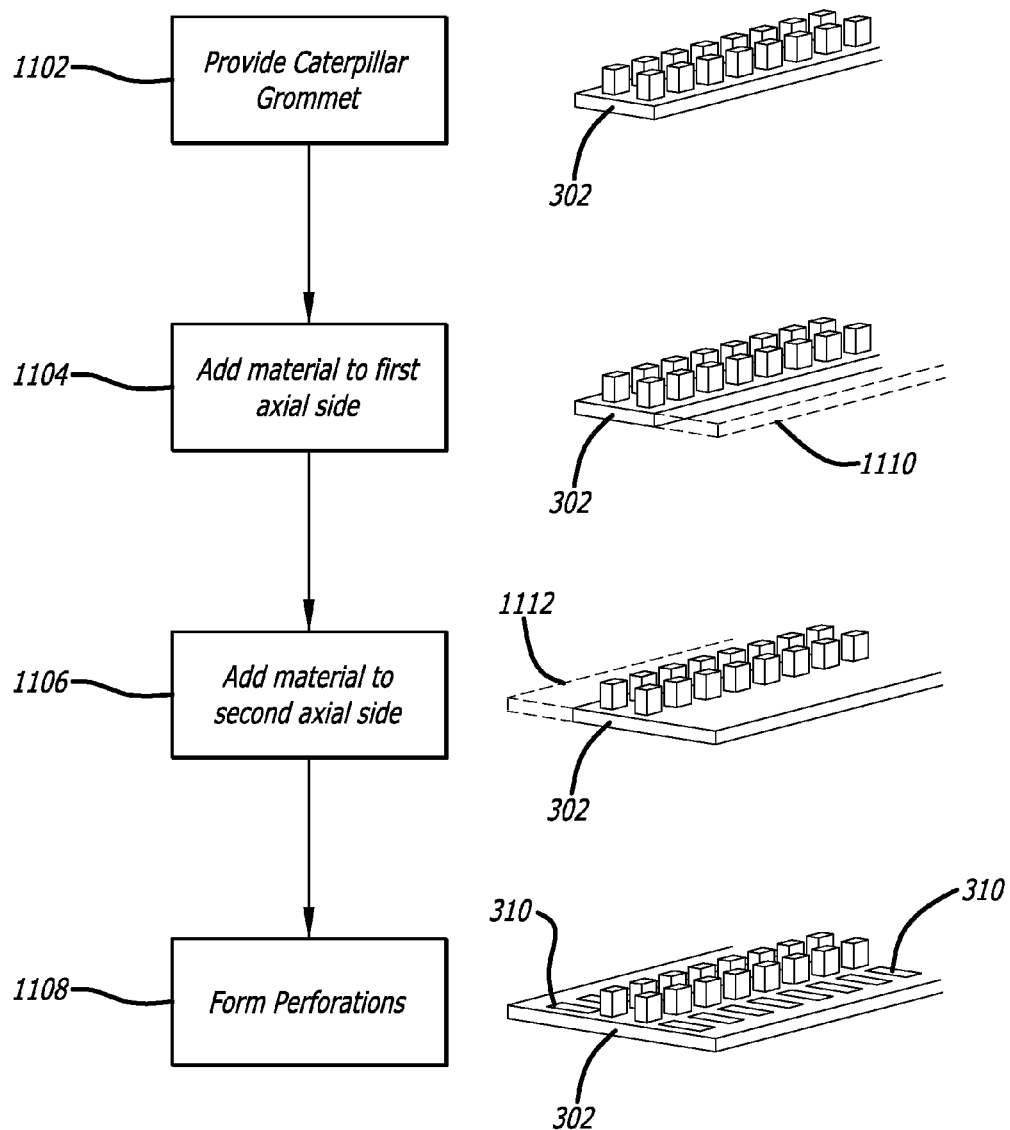

T-STYLE GROMMET ATTACHMENT SYSTEM AND METHOD

BACKGROUND

1. Technical Field

The disclosure generally relates to an apparatus for routing cabling and/or wiring, and in particular, to a modified T-style grommet for routing wire through a structure.

2. Related Art

In most vehicles, electrical wires and/or cables are used to connect various components of the vehicle to a control unit. For example, in aircraft, wiring and/or cabling 12 may be routed via a wire bundle or harness through apertures 14 formed in the aircraft structure 16 to connect the aircraft components to their respective control units, as shown in FIG. 1. FIGS. 2a through 2c depict examples of how a wire is presently routed through the structure of an aircraft.

As shown, the wire 12 is secured to an aircraft structure 16 by hardware comprising, among other things, various brackets, rivets, stand-offs, p-clips, spacers, screws, washers, nuts, and clamps. For aircraft, in particular, caterpillar-type grommets are generally required to be installed on any aperture that has a wire bundle routed through it, even if the bundle only contains a single wire, to protect the wires from damage caused by chaffing or rubbing against the edge of the aperture. Thus, the brackets and related hardware currently used to secure wire to an aircraft structure has many drawbacks. For example, the hardware is bulky and heavy and the installation and re-installation of the hardware are time consuming, tedious and costly because the hardware includes many parts.

Accordingly, a need therefore exists for a simpler and more cost-and-weight effective method for securing wires and cabling to a structure.

SUMMARY

A grommet is provided for bundling and securing a conveyance system component routed through a structure. In one example, the grommet may include a strap having a first and second side and a plurality of spaced apart perforations formed along at least a portion of a length of the strap. The grommet also includes two or more pairs of ribs formed along at least a portion of the first side of the strap, where the ribs cooperatively define a channel for receiving an edge of an aperture formed in the structure. The grommet further includes a plurality of spaced apart perforations formed along at least a portion of the length of the strap. The conveyance system component may include electrical cabling, hydraulic lines, air lines, ducts, or other conveyance system components routed through a structure.

A system for protecting and securing a conveyance system component is also provided. The system includes, in addition to the grommet, a structure having an aperture through which the wire is routed. The grommet includes a strap having a first and second side and two or more pairs of ribs formed along at least a portion of the first side of the strap, where the ribs cooperatively define a channel for receiving a edge of the aperture. The grommet further includes a plurality of spaced apart perforations formed along at least a portion of the length of the strap.

A method of manufacturing a grommet for bundling and securing a conveyance system component routed through a structure is further provided. The method includes providing a grommet comprising a strap having a first and second side, and two or more pairs of ribs formed along at least a portion of the first side of the strap, where the ribs cooperatively define a channel. Next, material is added to a first axial side of the strap and an opposite axial side of the strap. The method further includes forming two or more spaced apart perforations along at least a portion of a length of the strap.

Other devices, apparatus, systems, methods, features and advantages of the disclosure will be or will become apparent to one with skill in the art upon examination of the following figures and detailed description. It is intended that all such additional systems, methods, features and advantages be included within this description, and be protected by the accompanying claims.

BRIEF DESCRIPTION OF THE FIGURES

The present disclosure may be better understood by referring to the following figures. The components in the figures are not necessarily to scale, emphasis instead being placed upon illustrating the principles of the disclosure. In the figures, like reference numerals designate corresponding parts throughout the different views.

FIG. 11 is a flow diagram that illustrates one example method of manufacturing a grommet of the present disclosure.

DETAILED DESCRIPTION

Figure 1:
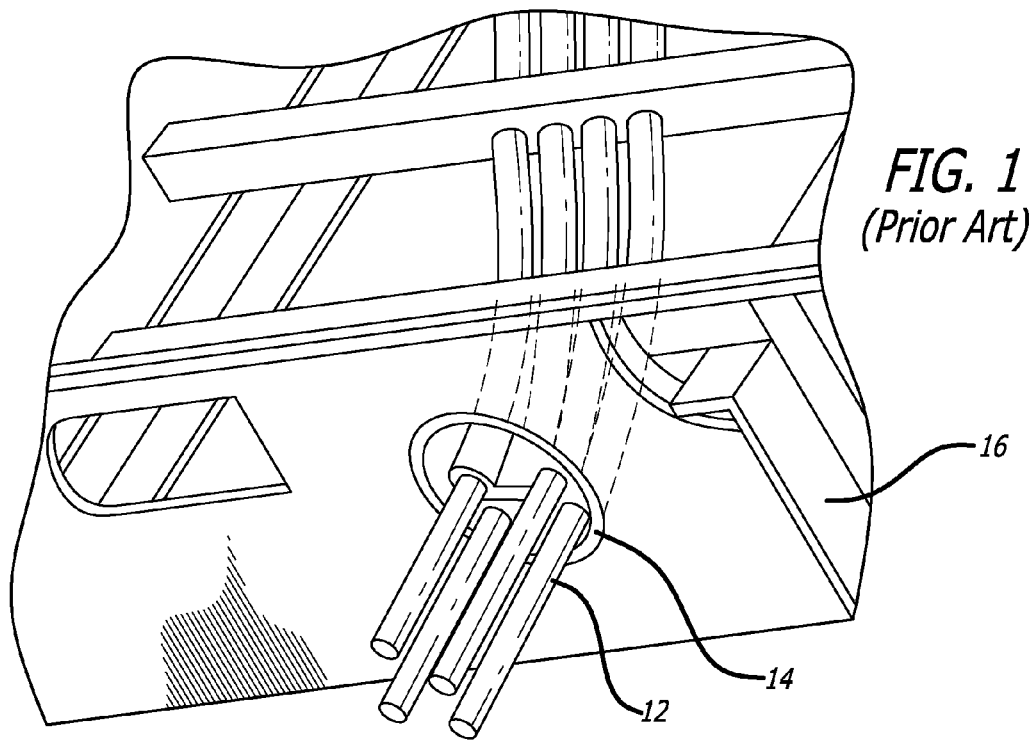
FIG. 1 (Prior Art) is a schematic of a wire harness routed through an aircraft structure.
Figure 2A:
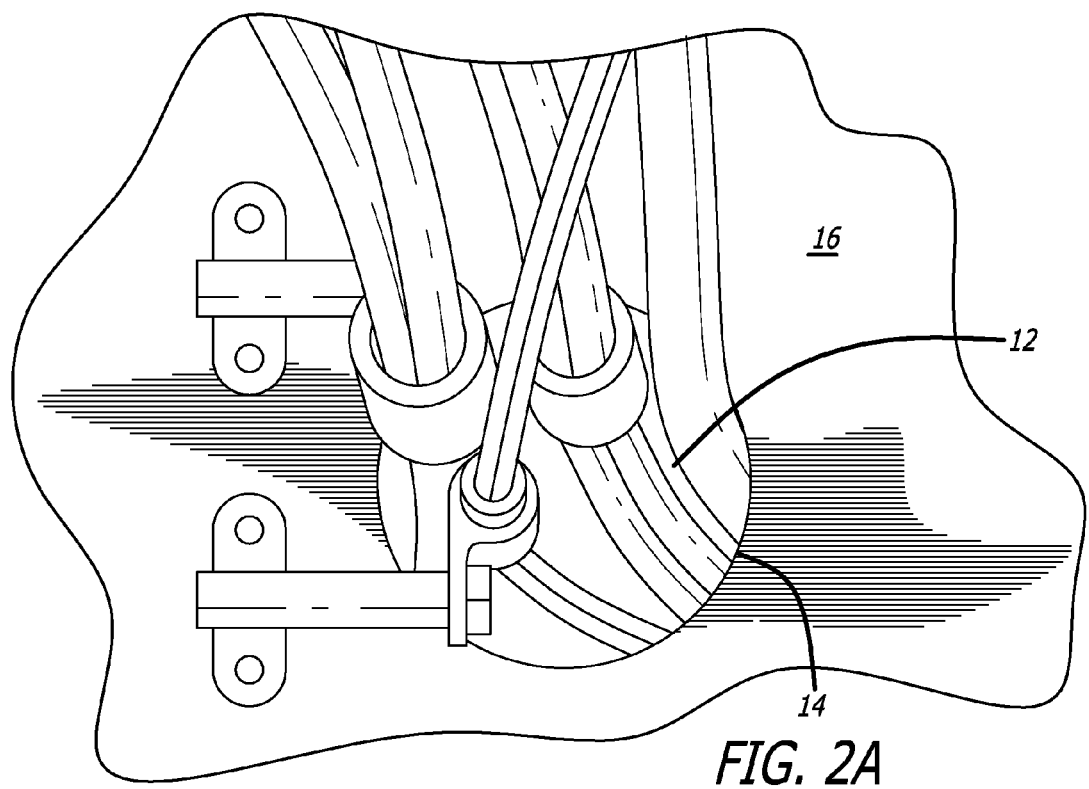
FIGS. 2a-2c (Prior Art) are perspective views illustrating how wire harnesses are currently installed in aircraft structures.
Figure 2B:
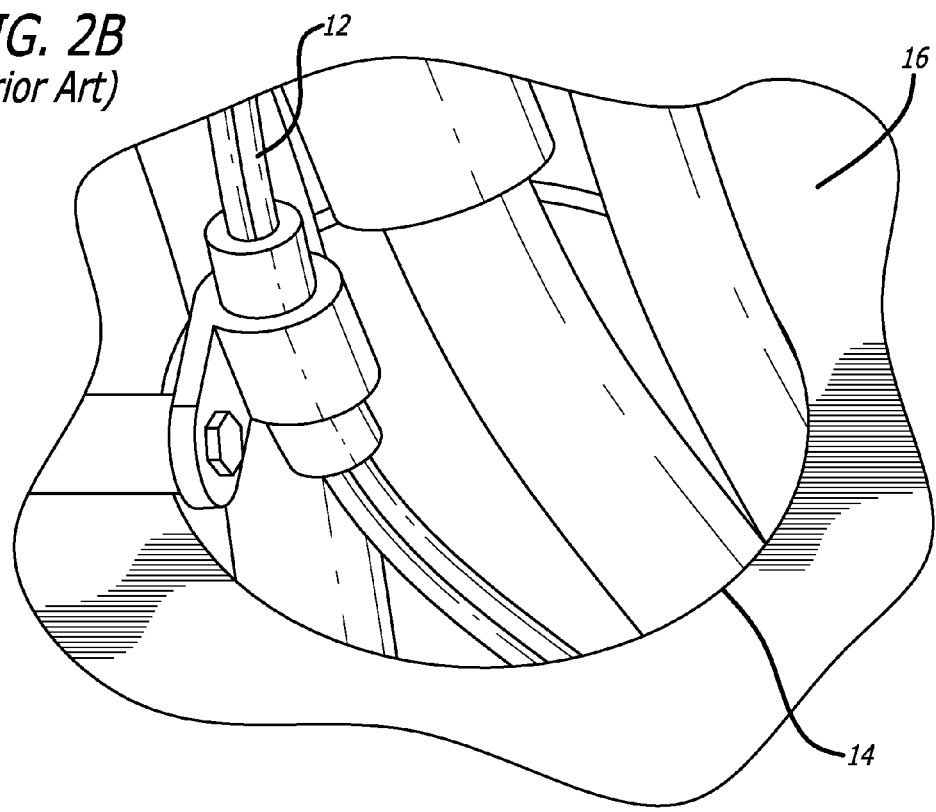
Figure 2C:
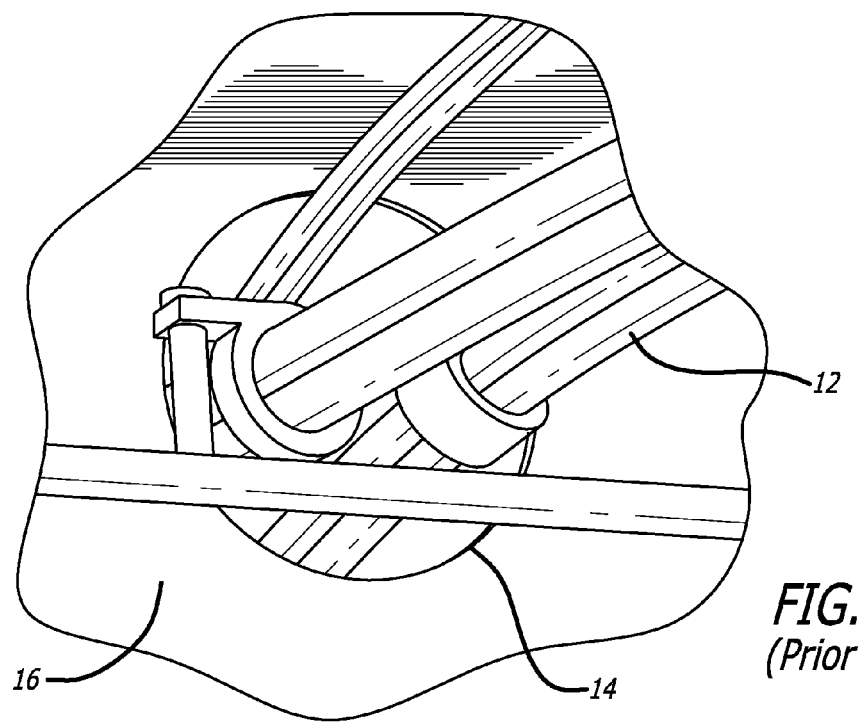

FIGS. 3-10 illustrate various examples of different implementations of a grommet of the present disclosure. In particular, FIG. 3a illustrates a plan view of one example of an implementation of a grommet 300 of the present disclosure. The grommet 300 may include a planar strap 302 having a first end 304, an opposing second end 306, and a plurality of projection or raised ribs 308 formed along the centerline of the strap 302, between the first and second ends 304, 306. As shown, the ribs 308 may be integrally formed with the straps 302 in spaced rows along the centerline of the strap 302.

In other examples, the strap 302 may comprise a preformed ring having a unitary annular construction. The strap and ribs may be made of plastic, metal, ceramic, or any other suitable material. In particular, the strap 302 and ribs 308 may be made of polyamide (Nylon) or bondable polytetraflouroethylene (PTFE). In certain examples, the strap 302 may comprise a modified caterpillar grommet, such as an MS21266 or BACG20Z series caterpillar grommet.

As shown, the strap 302 may further include corresponding pairs of perforations 310 formed along the length of the strap 302. The perforations 310 may be formed in spaced rows along opposite sides of the ribs 308. Each perforation 310 may be appropriately dimensioned for receiving Panduit straps. Optionally, although not shown, the perforations 310 may be on only one side of the rib 308 and/or the rib 308 may be positioned on one end of the strap 302, rather than along the centerline, without departing from the disclosure.

Figure 3A:
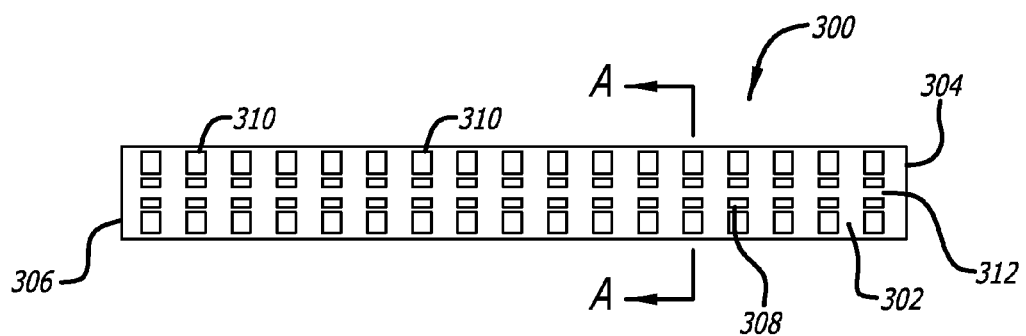
FIG. 3a is a plan view of a grommet according to one example of an implementation of the present disclosure.
Figure 3B:
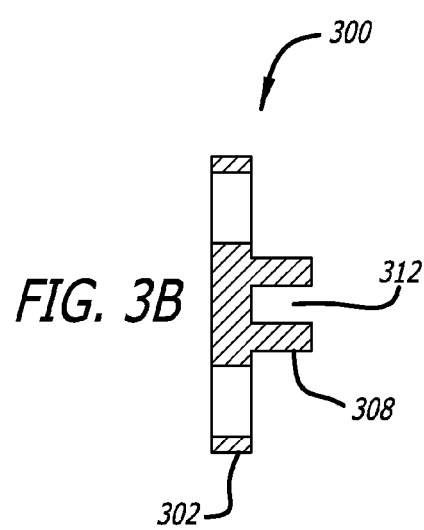
FIG. 3b is a cross-sectional elevation view of the grommet illustrated in FIG. 3a, taken across line A-A.

FIG. 3b is a cross-sectional view of grommet 300, along Section A-A. As shown, the strap 302 and raised ribs 308 form a T-shaped cross-section. The ribs 308 cooperatively define a channel 312 that extends along the entire length of the strap 302. The channel 312 is adapted (i.e., constructed to a suitable depth) to couple with the edge of an aperture formed in a floor beam, side wall or other vehicle structure. As such, the channel 312 may formed such that it is dimensioned to correspond to the thickness of the corresponding structure.

Figure 4:
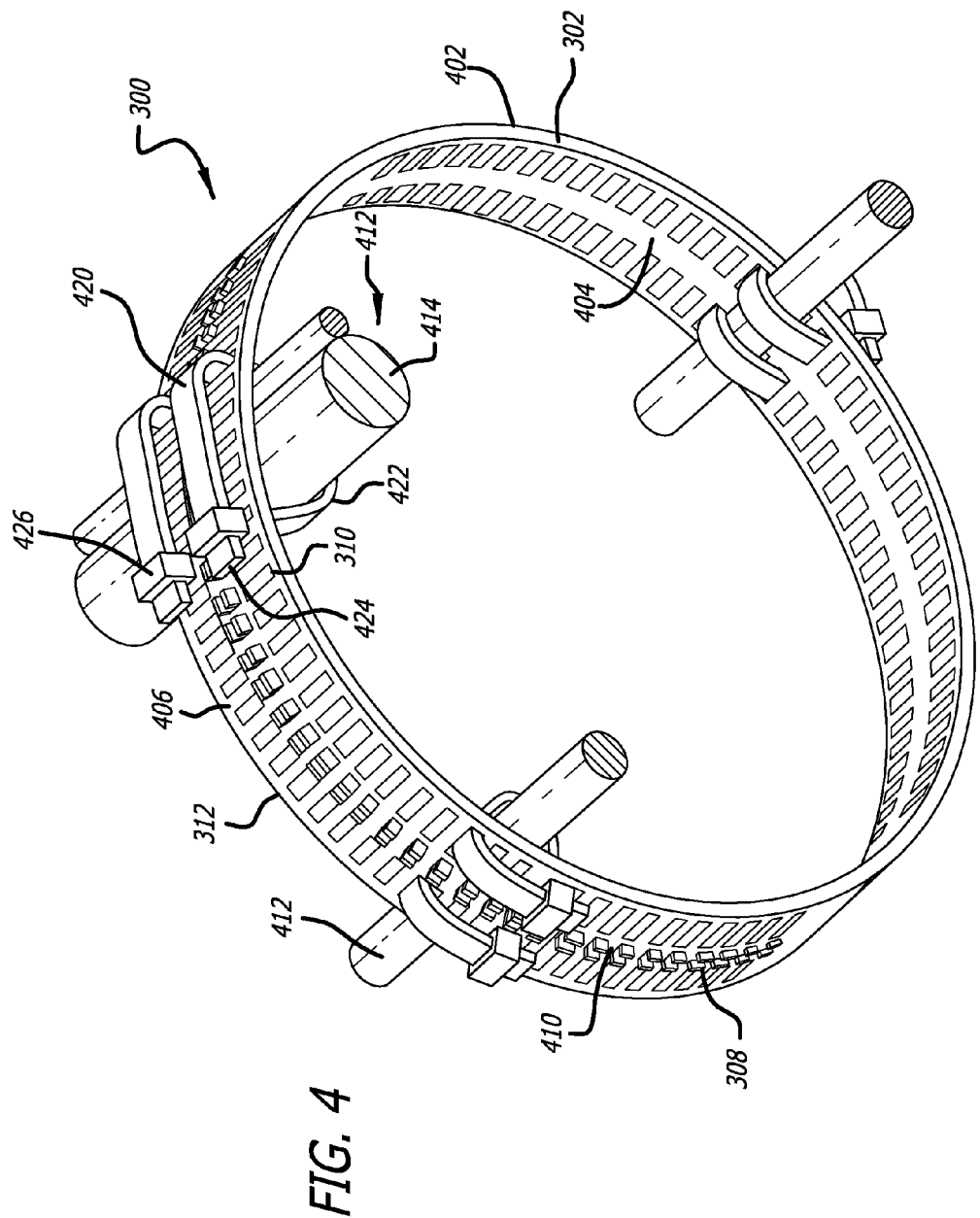
FIG. 4 is a perspective view showing the grommet of FIG. 3a assembled with wires bundled thereto.

FIG. 4 is a perspective view of the grommet 300 assembled, but not installed within an aperture of a structure. As shown, the first end 304 of the strap 302 may be mated together at junction 430 (see also FIG. 7) to form a closed loop or ring structure 402, having an inner diametrical surface 404, and an outer diametrical surface 406. In the closed loop formation, the channel 312 forms a continuous groove 410, both having diametrical dimensions corresponding to the dimensions of a mating aperture. As described in more detail below, the groove 410 is adapted to receive the edge of an aperture formed in a vehicle structure.

As further shown, one or more wire 414 or cable bundles 412 may be coupled to the inner surface 404 of the looped structure 402 by one or more adjustable fasteners 420 adapted to engage the perforations 310. In the illustrated example, the fasteners 420 may be adjustable cable tie straps, such as cable ties, Standard Part No. BACS38K, manufactured by Panduit Corp., Tinley Park, Ill. 60487 (Cage Code 06383), or HellermannTyton North America, Milwaukee, Wis. 53224 (Cage Code 53421). In other implementations, the fasteners 420 may include other types of adjustable fasters.

As shown, each fastener 420 may include a strap body 422 having a free end 424 and locking head 426, where the free end 424 is inserted through a first perforation 310 and around the wire bundle 414. Then, the free end 424 is inserted into a second perforation 310 on the other side of the wire bundle 412 and threaded around to the outer surface 406 of the strap 302 and through a locking passageway of the locking head 426 to secure the wire bundle 412 to the inner surface 404 of the looped structure 402. After the free end 424 has been inserted through the locking head 426, the strap 420 may be tightened around the wire bundle 414 by pulling the free end 424 further through the locking head 426 to secure the wire bundle 412 to the loop structure 402. The self-locking function of the tie straps 420 is well known in the art and, therefore, will not be described in detail herein.

Figure 5:
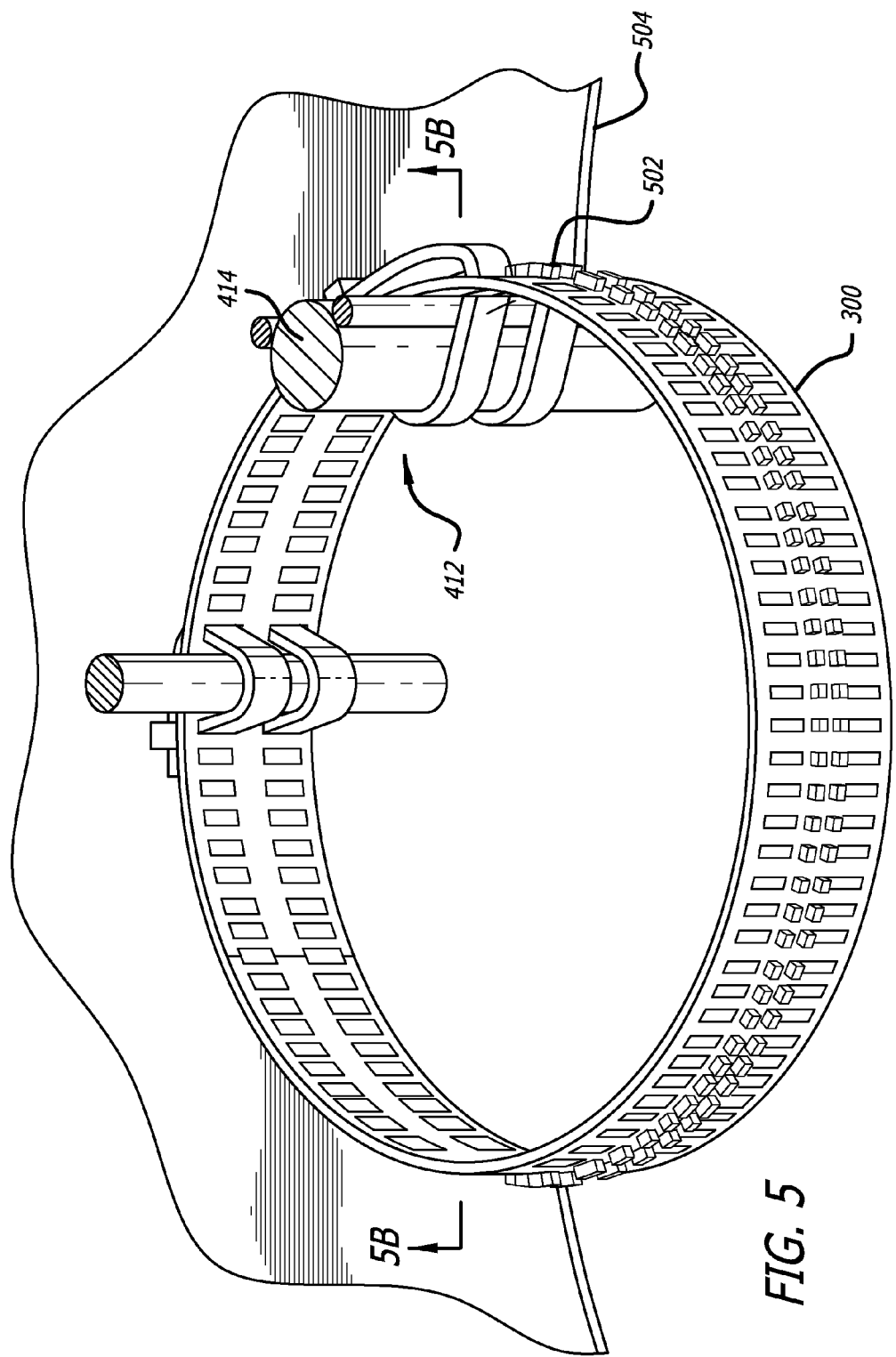
FIG. 5 is a top perspective view showing the grommet of FIG. 3a assembled and installed within an aperture of a structure.
Figure 6:
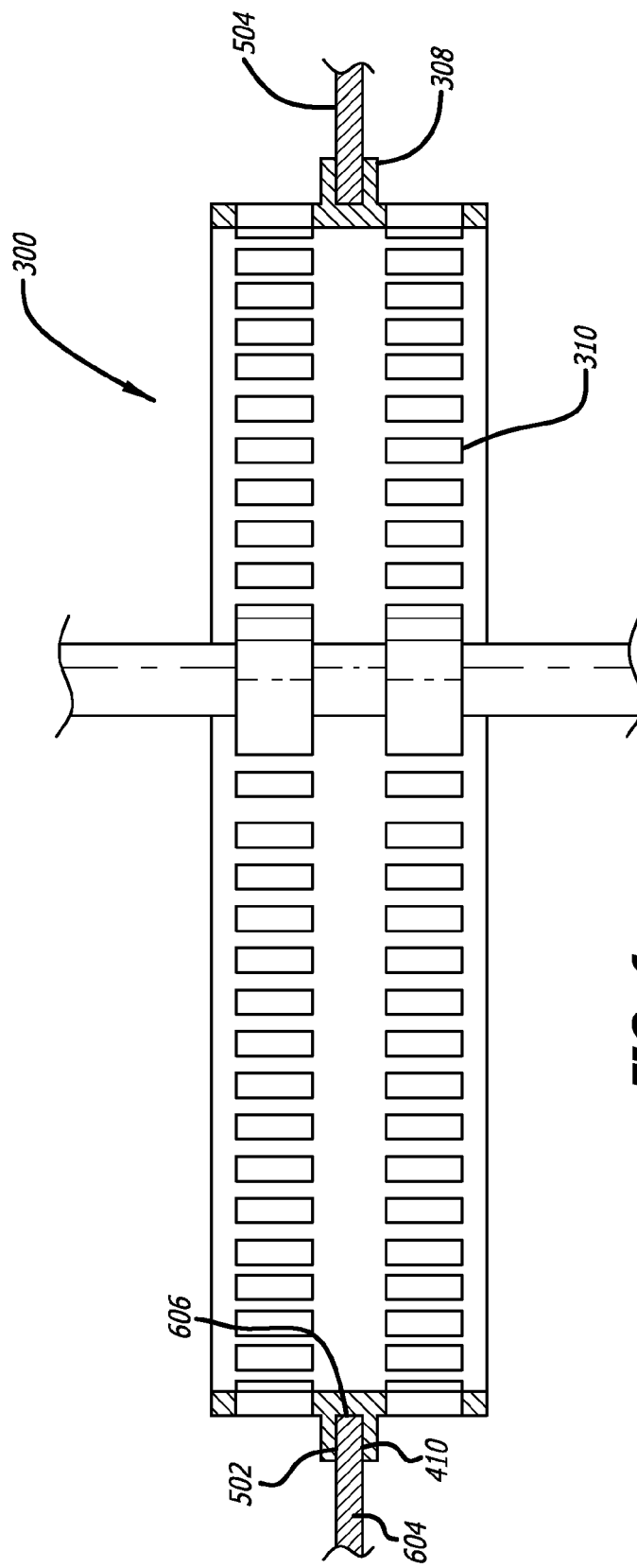
FIG. 6 is a side view of the grommet illustrated in FIG. 5, taken across line 5B-5B.
Figure 7:
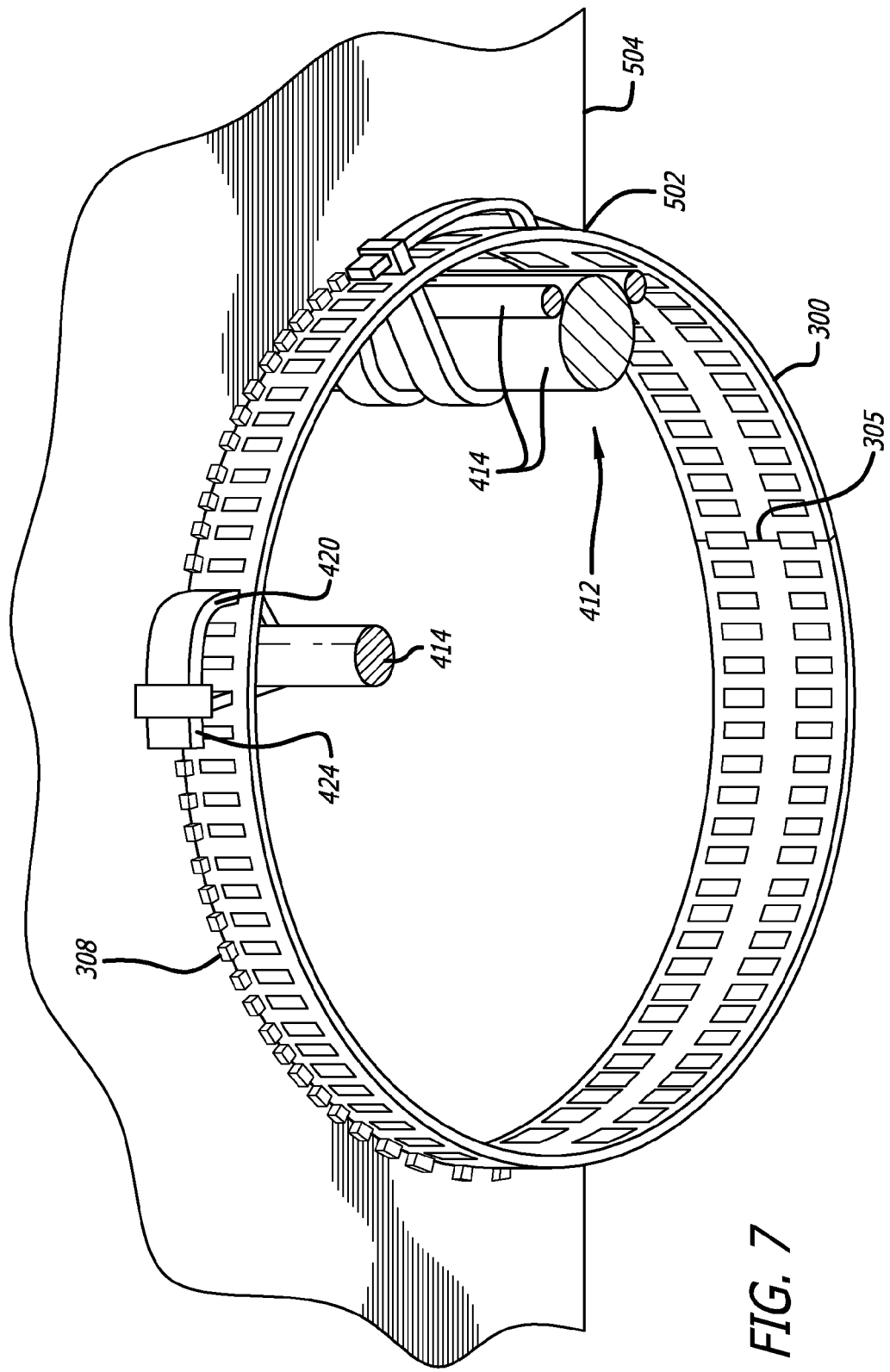
FIG. 7 is a bottom perspective view of the grommet as illustrated in FIG. 5.

FIGS. 5-7 illustrated one example of the grommet 300 positioned within an aperture 502 in a wall or floor of a vehicle. All of the illustrated FIGS. 5-7 show a portion of the wall or floor cut away to illustrate the positioning of the grommet 300 within the aperture. FIG. 5 is a top perspective view showing the grommet 300 of FIG. 3a assembled and installed within an aperture 502 of a wall or floor 504 of a structure. FIG. 6 is a side view of the grommet illustrated in FIG. 5 and FIG. 7 is a bottom perspective view of the grommet 300 illustrated in FIG. 5.

As illustrated, groove 410 of the grommet 300 may be constructed to dimensions corresponding to the thickness 604 of the wall or floor 504 where the aperture 502 has been created, such that the edge 606 of the aperture 502 may be received by the groove 410 to secure the grommet 300 to the edge 606 of the aperture 502 by a snug, or interference fit. In other examples, the grommet 300 may be secured to the edge 606 of the aperture 502 by an adhesive or other suitable means. Further, groove 410 may be constructed to a depth sufficient to prevent the grommet 300 from being dislodged once it is installed in the aperture 502.

Figure 8:
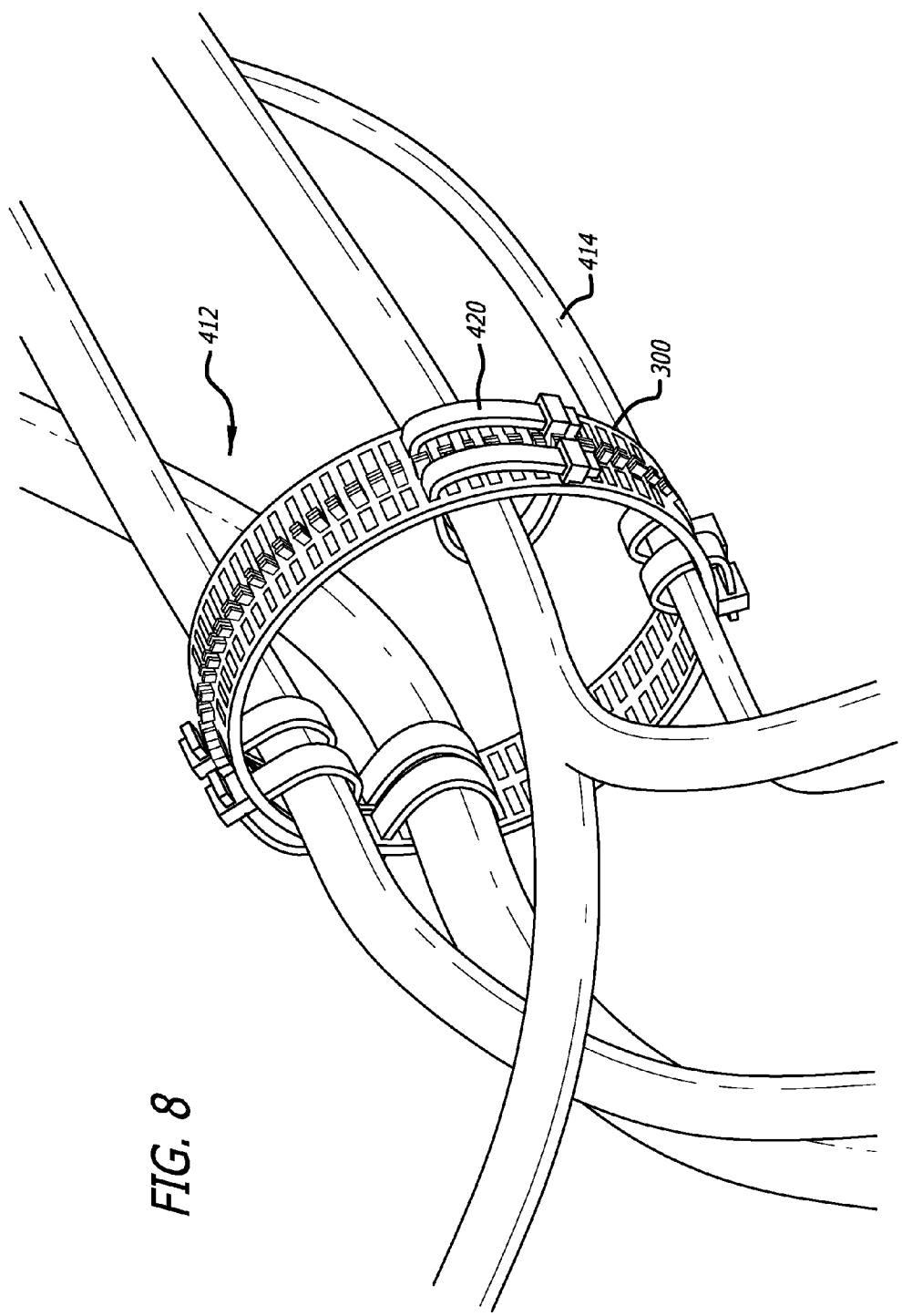
FIG. 8 is a perspective view showing a grommet according to another example of an implementation of the present disclosure with wires bundled thereto.

FIG. 8 is a perspective view of the assembly of the grommet 300 with the wires 414 and/or wire bundles 412. As illustrated, grommets 300 of the present disclosure may be used apart from an aperture to organize and/or gather the wires 414 together at various locations throughout the structure.

Figure 9:
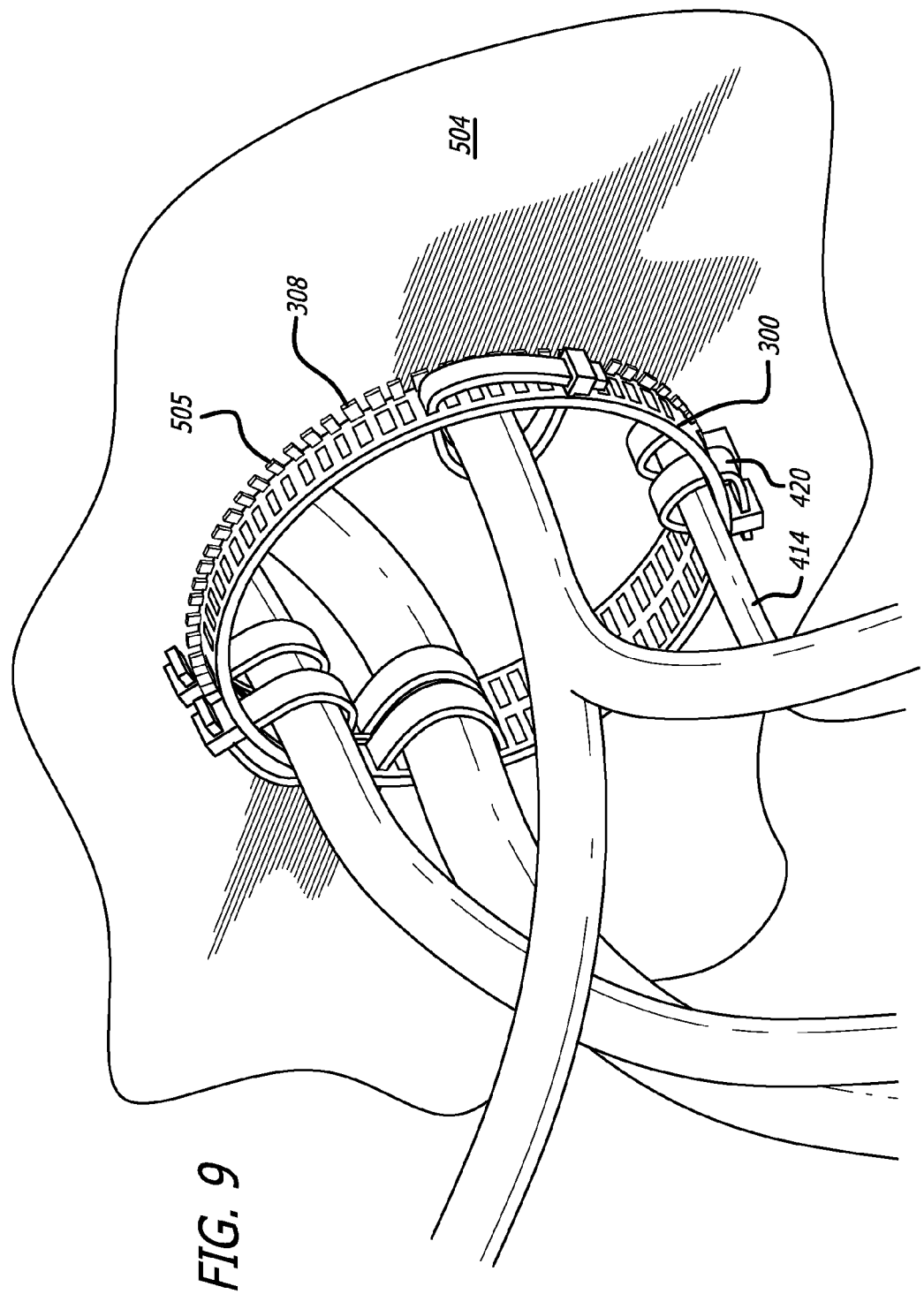
FIG. 9 illustrates a perspective view of an additional example of an implementation of a grommet of the present disclosure installed within an aperture of a structure.

FIG. 9 is another perspective view of the grommet 300 installed within the aperture 502 of the aircraft structure. As shown in FIG. 9, the grommet 300 not only provides a more effective means for securing wires 414 routed through a structure aperture 502, but it also protects the wires 414 from chaffing or rubbing against the sharp edges of the aperture 502, which may strip or otherwise damage the wires 414 in the bundle 412. Moreover, some wires 414 may require certain spacing between them to reduce signal or frequency interference. In such instances, grommets of the present disclosure provide a user-friendly means of separating the wire bundle 412 during installation.

Figure 10:
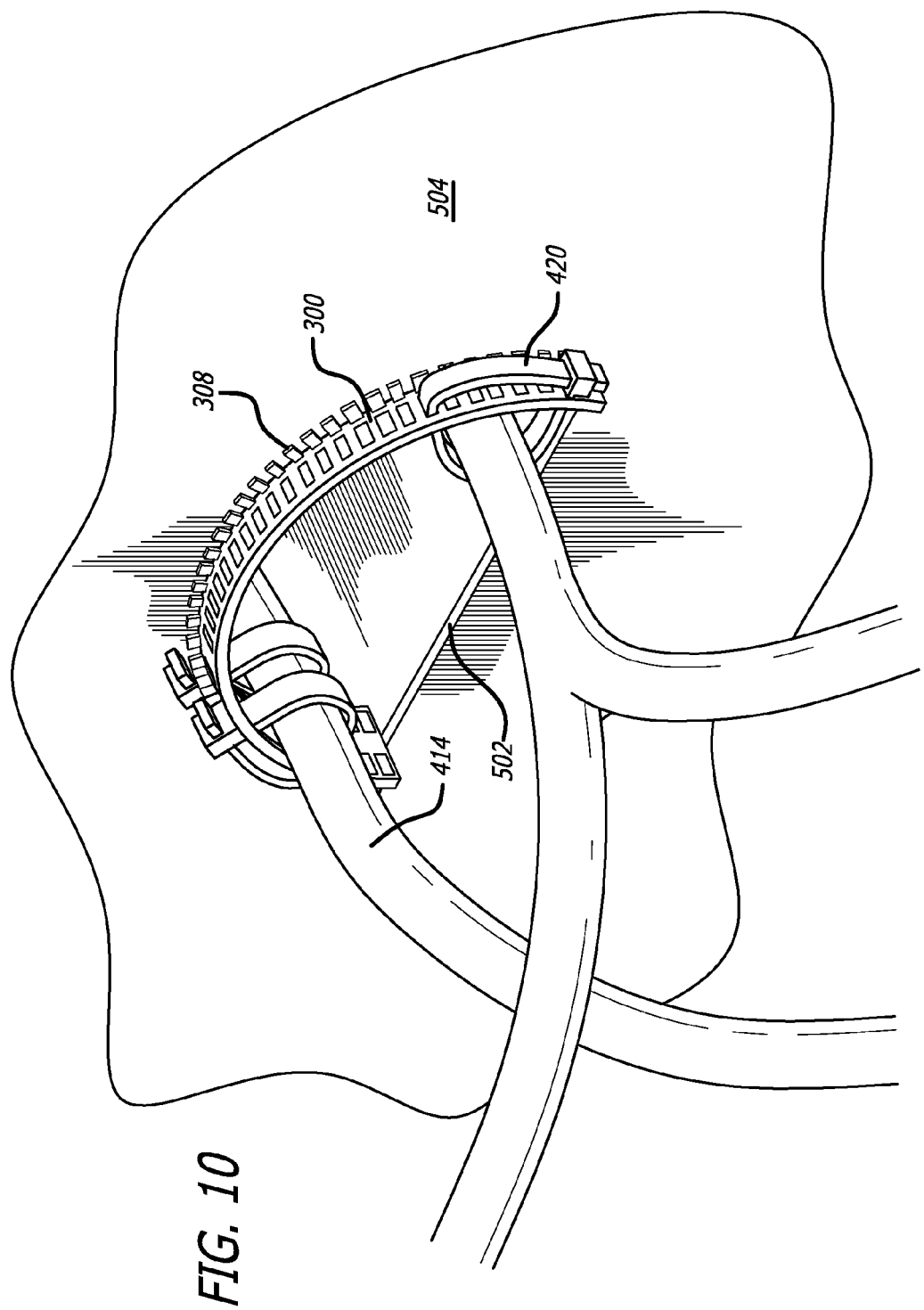
FIG. 10 illustrates a perspective view of yet another example of an implementation of a grommet of the present disclosure installed within an aperture of a structure.

FIG. 10 is perspective view of another implementation of the grommet 300 installed within the aperture 502 of a floor or wall 504 of a structure. As shown in FIG. 10, the grommet 300 may form a semicircular structure and be adapted for securing within apertures having various shapes and dimensions.

In operation, the strap 302 is first provided in strip form and then cut, or sized to the diametrical dimensions of the aperture 502. Once sized, the groove 410 of the strap 302 is then positioned along the opening edges of the aperture 502 and the first and second ends 304 and 306 of the strap 302 are mated together. The strap 302 may be secured to the opening edges of the aperture 502 by purely a press, friction or interference fit and/or may be reinforced with adhesive or the like. When securing the grommet 300 to elongated apertures 502, the grommet may only be secured, for example by adhesive, to certain portions of the aperture to maintain the hole configuration and eliminate any loose portions. Once secured within the aperture 502, the wires 414 or wire bundles 412 passing through the aperture 502 may be fastened to the strap 302 by threading the adjustable fasteners, such as ties, through the perforations 310 in the strap 302.

In certain implementations, grommets of the present disclosure may be made by adapting or modifying an industry standard caterpillar grommet currently existing in the market, for example only, a standard MS21266 or BACG20Z series caterpillar grommet. FIG. 11 illustrates an example of one implementation of a method 1100 of manufacturing grommets of the present disclosure. The method starts by providing a standard grommet (at step 1102). Next, at step 1104 material 1110 may be added to first axial side of the strap 302. At step 1106, material 1112 may be added to first axial side of the strap 302. In steps 1104 and 1106, additional material may be added to the axial sides of the strap 302 by injection molding, heat sealing, electrofusion, welding or other suitable means. In other implementations, additional material 1110, 1112 may only be added to one axial side of the strap 302.

After additional material 1110, 1112 is added to the strap 302, perforations 310 may be formed in the strap 302 along opposite sides of the ribs 308. The perforations 310 may be formed by milling, drilling, stamping, waterjet cutting, laser cutting, or other suitable means. In other implementations, the perforations may be formed in the injection mold.

While particular implementations of the present disclosure have been described herein as being applied when routing wires and cabling through an aircraft structures or, more generally, vehicles, persons skilled in the art will appreciate that the present invention is not limited to these applications, but may also be applied when routing wiring and cabling through boats, homes, or any other structure where wiring is routed through. Persons skilled in the art will further appreciate that the present disclosure is not limited to electrical cabling and wiring applications, but grommets of the present disclosure may be used to bundle and mount hydraulic lines, air lines, ducts, and other conveyance system components routed through a structure. Those skilled in the art will also recognize that the dimensions of the groove 410 of the grommet 300 may vary based upon application.

While particular implementations of the present disclosure have been described herein as being applied to structure apertures having circular construction, persons skilled in the art will appreciate that grommets of the present invention may be incorporated into structure apertures of various sizes and shapes and is not limited to the implementations described above, but may vary based upon the desired application. Persons skilled in the art will also appreciate that perforations formed in the strap may be arranged in various row configurations, such as configured in one row, four rows (i.e., having two rows on opposite sides of the rib), three rows (i.e., having two rows on one side of the rib and two rows on the opposite side of the rib), or any other desired configuration.

Grommets according to the present disclosure provide many advantages over existing hardware and mechanisms used to route wires, cabling and other conveyance system components through structures. These advantages include a simple product design, decreased installation time, simple installation process, a slimline lightweight construction, cheaper to manufacture and assemble, its components may be adapted from existing parts on the market, provides decreased re-work (installation) time if necessary, and the assembly requires less parts.

In general, terms such as "coupled to," and "configured for coupling to" and "secured to" (for example, a first component is "coupled to" or "is configured for coupling to" or is "secured to" a second component), or "communicate" (for example, a first component "communicates with" or "is in communication with" a second component) are used herein to indicate a structural, functional, mechanical, electrical, signal, optical, magnetic, electromagnetic, ionic or fluidic relationship between two or more components (or elements, features, or the like). As such, the fact that one component is said to couple to a second component is not intended to exclude the possibility that additional components may be present between, and/or operatively associated or engaged with, the first and second components.

Although the previous description only illustrates particular examples of various implementations, the present disclosure is not limited to the foregoing illustrative examples. A person skilled in the art is aware that the disclosure as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. Modifications and variations are possible in light of the above description.

What is claimed is:

1. A grommet for bundling and securing a conveyance system component routed through a structure, the grommet comprising:
   a strap having a first and second side;
   two or more pairs of ribs formed along at least a portion of the first side of the strap, where the ribs cooperatively define a channel for receiving an edge of an aperture formed in the structure; and
   a plurality of spaced apart perforations formed along at least a portion of a length of the strap, where corresponding pairs of the spaced apart perforations are formed along opposite sides of the ribs.

2. The grommet of claim 1, where the ribs are formed along a centerline of the strap.

3. The grommet of claim 1, further comprising at least one adjustable fastener coupled between at least two of the perforations for securing the component of the conveyance system to the second side of the strap.

4. The grommet of claim 3, where the fastener is a cable tie.

5. The grommet of claim 1, where the channel forms a seat for receiving the edge of the aperture.

6. The grommet of claim 5, where seat is secured to the edge of the aperture by an adhesive.

7. The grommet of claim 5, where the seat is secured to the edge of the aperture by a press or interference fit.

8. The grommet of claim 1, where the conveyance system component comprises any combination of components selected from the group consisting of electrical cabling, hydraulic lines, air lines, or ducts.

9. A system for protecting and securing a conveyance system component, comprising:
   a structure having an aperture through which the component of the conveyance system is routed;
   a grommet comprising:
      a strap having a first and second side;
      two or more pairs of ribs formed along at least a portion of the first side of the strap, where the ribs cooperatively define a channel for receiving an edge of the aperture; and
      a plurality of spaced apart perforations formed along at least a portion of a length of the strap, where corresponding pairs of the spaced apart perforations are formed along opposite sides of the ribs.

10. The grommet of claim 9, where the ribs are formed along the centerline of the strap.

11. The grommet of claim 9 further comprising at least one adjustable fastener coupled between at least two of the perforations for securing the wire to the second side of the strap.

12. The grommet of claim 9, where the channel forms a seat for receiving the edge of the aperture.

13. The grommet of claim 12, where seat is secured to the edge of the aperture by an adhesive.

14. The grommet of claim 9, where the conveyance system component comprises any combination of components selected from the group consisting of electrical cabling, hydraulic lines, air lines, or ducts.

15. A method of manufacturing a grommet for bundling and securing a conveyance system component routed through a structure, comprising:
   providing the grommet comprising:

a strap having a first and second side; and
two or more pairs of ribs formed along at least a portion of the first side of the strap, where the ribs cooperatively define a channel;
adding material to a first axial side of the strap;
adding material to an opposite axial side of the strap; and
forming two or more spaced apart perforations along at least a portion of a length of the strap.

16. The method of claim 15, where the ribs are formed along the centerline of the strap.

17. The method of claim 15, where corresponding pairs of the spaced apart perforations are formed along opposite sides of the ribs.

* * * * *